US012179835B2

(12) United States Patent
Wang et al.

(10) Patent No.: US 12,179,835 B2
(45) Date of Patent: Dec. 31, 2024

(54) VEHICLE COUPLING ASSISTANCE DEVICE, VEHICLE COUPLING ASSISTANCE METHOD, VEHICLE COUPLING ASSISTANCE SYSTEM, AND STEERING CONTROL DEVICE

(71) Applicant: Hitachi Astemo, Ltd., Hitachinaka (JP)

(72) Inventors: Jian Wang, Hitachinaka (JP); Taku Takahama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 423 days.

(21) Appl. No.: 17/435,950

(22) PCT Filed: Apr. 30, 2020

(86) PCT No.: PCT/JP2020/018217
§ 371 (c)(1),
(2) Date: Sep. 2, 2021

(87) PCT Pub. No.: WO2020/230640
PCT Pub. Date: Nov. 19, 2020

(65) Prior Publication Data
US 2022/0135125 A1 May 5, 2022

(30) Foreign Application Priority Data
May 13, 2019 (JP) .................. 2019-090763

(51) Int. Cl.
*B62D 12/02* (2006.01)
*B60D 1/62* (2006.01)
(Continued)

(52) U.S. Cl.
CPC ............. *B62D 12/02* (2013.01); *B60D 1/62* (2013.01); *B62D 6/002* (2013.01); *B62D 7/159* (2013.01); *B62D 13/005* (2013.01); *B62D 13/06* (2013.01)

(58) Field of Classification Search
CPC ........ B62D 12/02; B62D 6/002; B62D 7/159; B62D 13/005; B62D 13/06; B62D 15/0285; B60D 1/62; B60D 1/36
See application file for complete search history.

(56) References Cited

U.S. PATENT DOCUMENTS

| 6,292,094 B1 * | 9/2001 | Deng | B62D 7/159 |
| | | | 701/44 |
| 2002/0145662 A1 * | 10/2002 | Mizusawa | B60D 1/36 |
| | | | 348/113 |

(Continued)

OTHER PUBLICATIONS

International Search Report (PCT/ISA/210) issued in PCT Application No. PCT/JP2020/018217 dated Jun. 30, 2020 with English translation (five (5) pages).

(Continued)

*Primary Examiner* — James M McPherson
*Assistant Examiner* — Kyle J Kingsland
(74) *Attorney, Agent, or Firm* — Crowell & Moring LLP

(57) ABSTRACT

Provided is a vehicle coupling assistance device which is configured to select, in accordance with a physical quantity relating to an angle of a second coupling part of a trailer with respect to a first coupling part of a vehicle, as a steering angle control mode, any one of a first steering angle control mode in which a steering angle of front wheels of the vehicle and a steering angle of rear wheels of the vehicle are controlled to achieve the same steering angle and a second steering angle control mode f in which the steering angle of the front wheels and the steering angle of the rear wheels are controlled to achieve different steering angles, and to output steering angle control commands for executing control in the selected steering angle control mode to a front-wheel steering device and a rear-wheel steering device of the vehicle.

14 Claims, 12 Drawing Sheets

(51) Int. Cl.
  *B62D 6/00* (2006.01)
  *B62D 7/15* (2006.01)
  *B62D 13/00* (2006.01)
  *B62D 13/06* (2006.01)

(56) References Cited

U.S. PATENT DOCUMENTS

| | | | |
|---|---|---|---|
| 2010/0096203 A1 | 4/2010 | Freese et al. | |
| 2013/0054092 A1* | 2/2013 | Kossira | B62D 7/1509 |
| | | | 701/42 |
| 2014/0081523 A1* | 3/2014 | Filla | B62D 7/1509 |
| | | | 701/41 |
| 2019/0064831 A1* | 2/2019 | Gali | B62D 13/06 |

OTHER PUBLICATIONS

Japanese-language Written Opinion (PCT/ISA/237) issued in PCT Application No. PCT/JP2020/018217 dated Jun. 30, 2020 (six (6) pages).

\* cited by examiner

VEHICLE COUPLING ASSISTANCE DEVICE, VEHICLE COUPLING ASSISTANCE METHOD, VEHICLE COUPLING ASSISTANCE SYSTEM, AND STEERING CONTROL DEVICE

TECHNICAL FIELD

The present invention relates to a vehicle coupling assistance device, a vehicle coupling assistance method, a vehicle coupling assistance system, and a steering control device for assisting in coupling between a vehicle and a trailer through automatic control of steering angles.

BACKGROUND ART

In Patent Literature 1, there is disclosed an automatic docking system for coupling a towing vehicle and a towed vehicle to each other.

The automatic docking system includes a detector for detecting a plurality of detection targets provided on a coupling part of the towed vehicle, a controller, an automatic steering system for automatically steering front wheels, and an automatic braking system.

The controller obtains a position of the towed vehicle with respect to the towing vehicle based on detection results of the plurality of detection targets, and operates the automatic steering system and the automatic braking system in such a manner as to assist in the coupling between the towing vehicle and the towed vehicle.

CITATION LIST

Patent Literature

PTL 1: US 2010/0096203 A1

SUMMARY OF INVENTION

Technical Problem

Incidentally, in the case of the docking assistance system for automatically steering the front wheels of the towing vehicle based on a positional relationship between the towed vehicle (trailer) and the towing vehicle, an error in movement of the wheels with respect to a steering angle command is liable to increase due to influence of a self-aligning torque (SAT), a lateral force, and the like which occur as a result of a turn of the towing vehicle, and there is thus a fear in that accuracy of the coupling assistance may decrease.

The present invention has been made in view of the above-mentioned circumstances, and has an object to provide a vehicle coupling assistance device, a vehicle coupling assistance method, a vehicle coupling assistance system, and a steering control device which are capable of increasing accuracy of coupling assistance through automatic steering control.

Solution to Problem

According to the present invention, in one aspect thereof, there is selected, in accordance with a physical quantity relating to an angle of a second coupling part of a trailer with respect to a first coupling part of a vehicle, as a steering angle control mode, any one of a first steering angle control mode in which a steering angle of front wheels of the vehicle and a steering angle of rear wheels of the vehicle are controlled to achieve the same steering angle and a second steering angle control mode in which the steering angle of the front wheels and the steering angle of the rear wheels are controlled to achieve different steering angles, and steering angle control commands for executing control in the selected steering angle control mode are output to a front-wheel steering device and a rear-wheel steering device of the vehicle.

According to one embodiment of the present invention, the accuracy of coupling assistance through automatic steering control can be increased.

DESCRIPTION OF EMBODIMENTS

Figure 1:
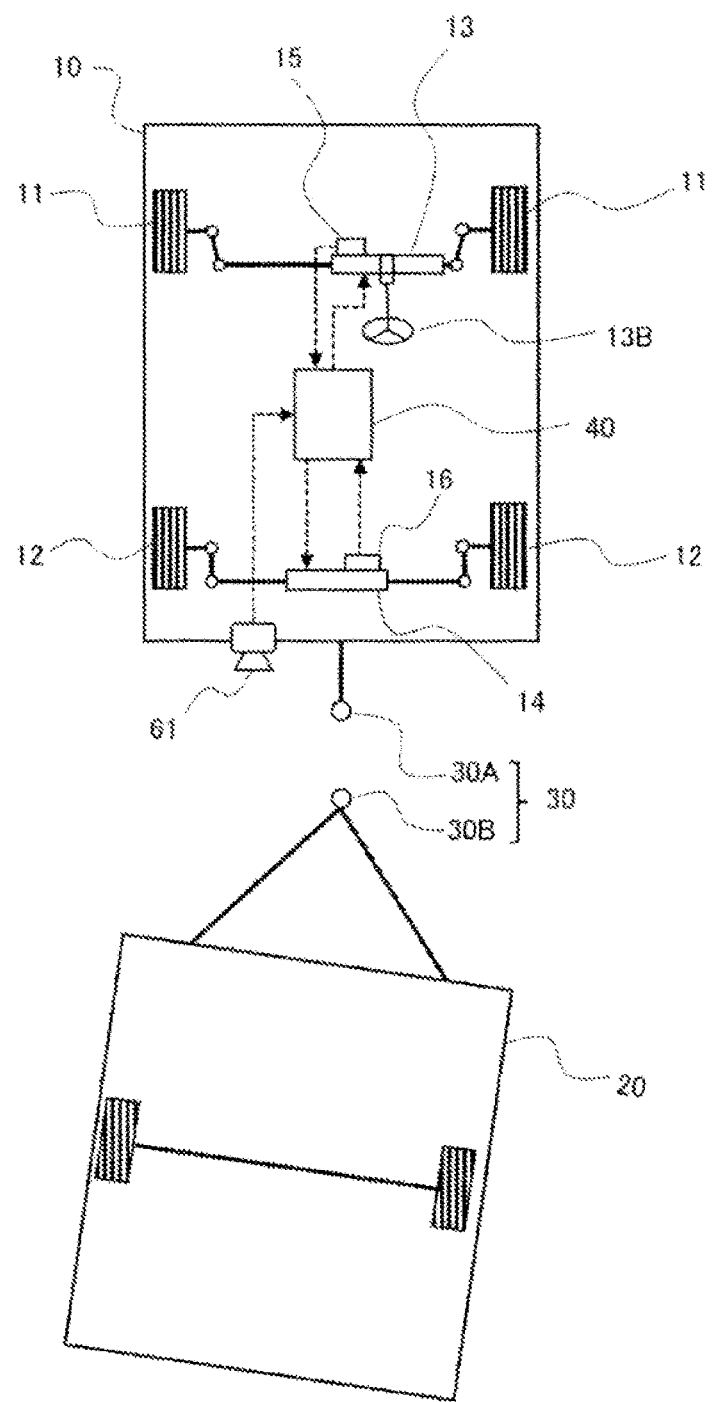
FIG. 1 is a diagram for illustrating a vehicle including a vehicle coupling assistance system and a trailer.

Referring to the drawings, description is now given of embodiments of a vehicle coupling assistance device, a vehicle coupling assistance method, a vehicle coupling assistance system, and a steering control device according to the present invention.

FIG. 1 is a configuration diagram of a vehicle 10 including the vehicle coupling assistance system according to the present invention.

The vehicle 10 of FIG. 1 is a four-wheeled vehicle including a pair of left and right front wheels 11 and 11 and a pair of left and right rear wheels 12 and 12, and is a towing vehicle for towing a trailer 20 (towed vehicle).

The trailer 20 is coupled to a rear side of the vehicle 10 through a coupler 30.

The coupler 30 is formed of a first coupling part 30A which is installed in a rear part of the vehicle 10, and a second coupling part 30B which is installed in a front part of the trailer 20, and is to be detachably coupled to the first coupling part 30A. The trailer 20 is coupled to the vehicle 10 by coupling the second coupling part 30B to the first coupling part 30A.

The coupler 30 is formed of, for example, a combination of a hitch ball serving as the first coupling part 30A and a hitch coupler serving as the second coupling part 30B.

The vehicle 10 includes a front-wheel steering device 13 configured to control a steering angle δf of the front wheels 11 and 11 and a rear-wheel steering device 14 configured to control a steering angle δr of the rear wheels 12 and 12. That is, the vehicle 10 includes a four-wheel steering system formed of the front-wheel steering device 13 and the rear-wheel steering device 14.

The front-wheel steering device 13 includes a steering actuator, for example, a motor, for generating a steering force. Moreover, the front-wheel steering device 13 is a steering device which can assist in an operation of a steering wheel 13B by a driver through use of the steering actuator, and can automatically steer the front wheels 11 and 11 through use of the steering actuator.

The front-wheel steering device 13 includes a front-wheel steering angle sensor 15 configured to detect the steering angle δf of the front wheels 11 and 11.

The rear-wheel steering device 14 includes a steering actuator, for example, a motor, for generating a steering force, and can automatically steer the rear wheels 12 and 12 through use of the steering actuator.

The rear-wheel steering device 14 includes a rear-wheel steering angle sensor 16 configured to detect the steering angle δr of the rear wheels 12 and 12.

A steering control device 40 is an electronic control device mainly formed of a microcomputer including a processor, a memory, an I/O, and a bus for connecting those components to each other, and executes calculation based on input various types of information and outputs steering angle control commands as calculation results to the front-wheel steering device 13 and the rear-wheel steering device 14.

The steering control device 40 executes a control program stored in the memory, to thereby achieve a steering control function, and has, as the steering control function, a function of assisting in the coupling between the vehicle 10 and the trailer 20 through four-wheel steering control.

That is, the steering control device 40 forms the vehicle coupling assistance device for assisting in the coupling between the vehicle 10 and the trailer 20, and has the function as a steering control unit included in the vehicle coupling assistance device.

Figure 2:
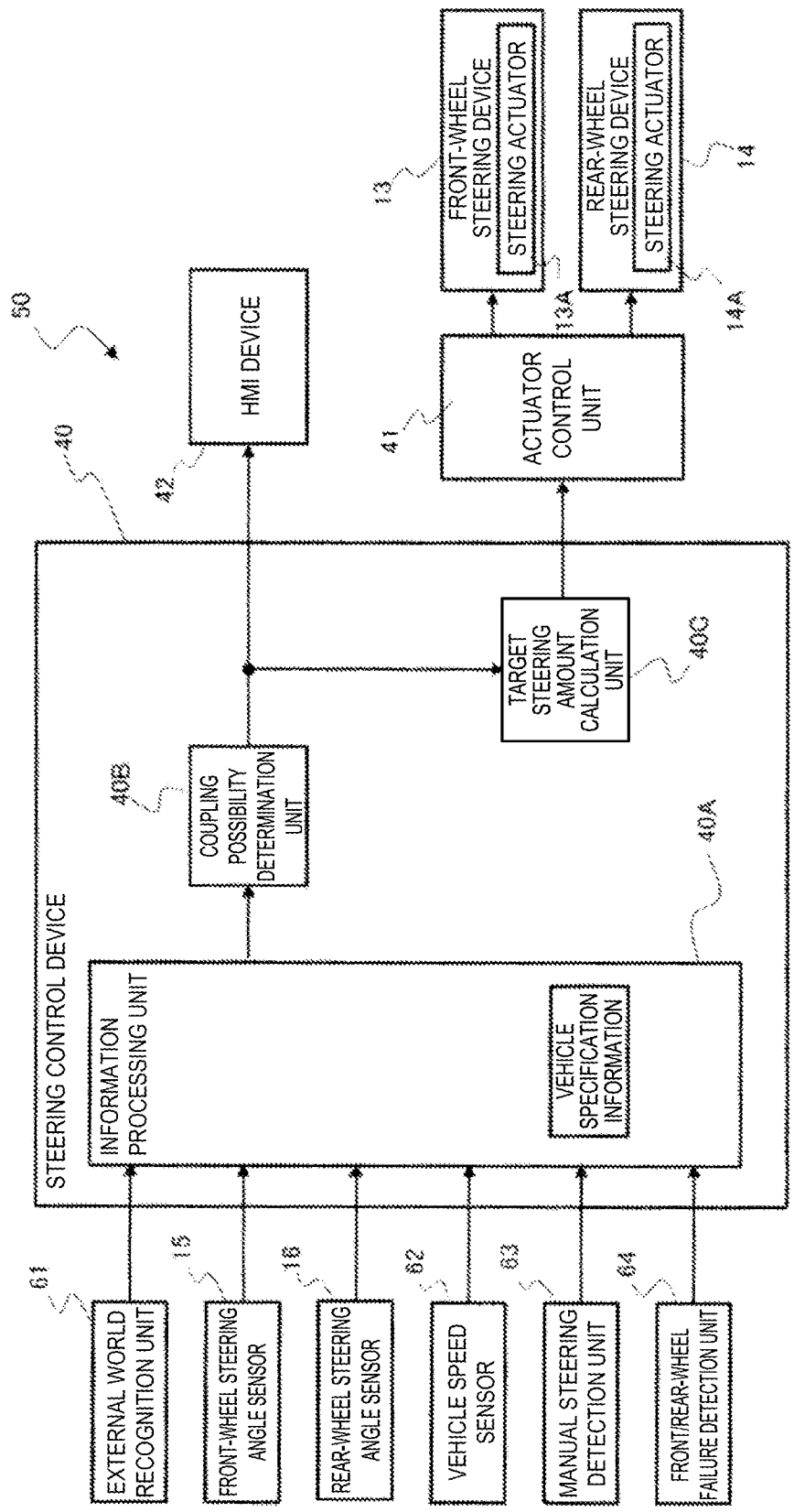
FIG. 2 is a block diagram for illustrating a configuration of the vehicle coupling assistance system.

FIG. 2 is a configuration block diagram of a vehicle coupling assistance system 50 including the front-wheel steering device 13, the rear-wheel steering device 14, and the steering control device 40.

The steering control device 40 acquires detection signals of various detectors included in the vehicle 10.

The vehicle 10 includes, as the various detectors, in addition to the above-mentioned front-wheel steering angle sensor 15 and rear-wheel steering angle sensor 16, an external world recognition unit 61, a vehicle speed sensor 62, a manual steering detection unit 63, and a front/rear-wheel failure detection unit 64. The external world recognition unit 61 acquires external world information on the vehicle 10. The vehicle speed sensor 62 detects a travel speed of the vehicle 10. The manual steering detection unit 63 detects absence/presence of manual steering by the driver. The front/rear-wheel failure detection unit 64 detects a failsafe state of the front wheels 11 and 11 and the rear wheels 12 and 12.

The external world recognition unit 61 is formed of, for example, a camera for taking an image of the rear side of the vehicle 10 and an image processing device for processing the image taken by the camera.

The failsafe state of the front and rear wheels detected by the front/rear-wheel failure detection unit 64 is a state in which the motion of the wheels does not follow the steering angle control commands given to the front-wheel steering device 13 and the rear-wheel steering device 14, and the steering angles are fixed to angles different from the steering angles corresponding to the steering angle control commands.

The front/rear-wheel failure detection unit 64 compares, for example, the information on the steering angles detected by the front-wheel steering angle sensor 15 and the rear-wheel steering angle sensor 16 and the steering angle control commands given to the front-wheel steering device 13 and the rear-wheel steering device 14 with each other, to thereby determine the absence/presence of the failsafe state in the front and rear wheels.

The steering control device 40 includes an information processing unit 40A, a coupling possibility determination unit 40B, and a target steering amount calculation unit 40C. The information processing unit 40A processes the detection signals of the various detectors. The coupling possibility determination unit 40B determines whether or not the vehicle 10 can be coupled to the trailer 20 through vehicle coupling assistance provided by the four-wheel steering control. The target steering amount calculation unit 40C calculates the target steering amounts (steering angle control commands) of the front and rear wheels for assisting in the coupling.

The information processing unit 40A uses vehicle specification information stored in the memory to process the detection signals of the various detectors.

An actuator control unit 41 acquires, as the steering control commands, signals relating to the target steering amounts of the front and rear wheels calculated by the target steering amount calculation unit 40C of the steering control device 40. After that, the actuator control unit 41 controls a steering actuator 13A of the front-wheel steering device 13, and controls a steering actuator 14A of the rear-wheel steering device 14.

Moreover, an HMI device 42 mounted to the vehicle 10 is a human machine interface including, for example, a liquid crystal display and a lamp, and notifies the driver (occupant) of the vehicle 10 of information relating to a determination result obtained by the coupling possibility determination unit 40B and the like.

That is, the HMI device 42 corresponds to a notification unit configured to notify the driver of the information relating to the coupling possibility. The steering control device 40 (steering control unit) outputs, to the HMI device 42, a command for notifying the driver that the coupling is impossible.

Description is now given of coupling assistance control (that is, coupling assistance using automatic control of the steering angles of the front and rear wheels) executed by the steering control device 40.

The coupling assistance control executed by the steering control device 40 is started when, for example, the driver of the vehicle 10 executes an operation of instructing start of the coupling assistance control.

In the coupling assistance control, the steering control device 40 selects, in accordance with a physical quantity relating to an angle of the second coupling part 30B with respect to the first coupling part 30A, any one of a first steering angle control mode in which the steering angle δf of the front wheels 11 and 11 and the steering angle δr of the rear wheels 12 and 12 are controlled to achieve the same steering angle and a second steering angle control mode in which the steering angle δf of the front wheels 11 and 11 and the steering angle δr of the rear wheels 12 and 12 are controlled to achieve different steering angles, and outputs the steering angle control commands for controlling the front-wheel steering device 13 and the rear-wheel steering device 14 in the selected steering angle control mode.

The steering control device 40 selects the first steering angle control mode when the angle of the second coupling part 30B with respect to the first coupling part 30A is smaller than a predetermined value, and selects the second steering angle control mode when the angle of the second coupling part 30B with respect to the first coupling part 30A is larger than the predetermined value.

The first steering angle control mode is an in-phase mode in which a steering direction of the front wheels 11 and 11 and a steering direction of the rear wheels 12 and 12 are the same, and is a mode in which the absolute value of the steering angle δf of the front wheels 11 and 11 and the absolute value of the steering angle δr of the rear wheels 12 and 12 are the same in the control commands.

In this embodiment, for example, the steering angles δf and δr [deg] from a neutral direction toward the right direction are indicated as positive angles, and the steering angles from the neutral direction toward the left direction are indicated as negative angles. Thus, the state in which the steering angles δf and δr are the same is the steering state in the first steering angle control mode in which the steering directions are the same and the steering angles are the same.

When the steering control device 40 controls the front-wheel steering device 13 and the rear-wheel steering device 14 in accordance with the first steering angle control mode, the vehicle 10 moves substantially in parallel in a lateral direction.

Meanwhile, when the steering control device 40 controls the front-wheel steering device 13 and the rear-wheel steering device 14 in accordance with the second steering angle control mode, the vehicle 10 moves while rotating.

When the vehicle 10 moves in parallel in the lateral direction, a steering angle error caused by influence of a self-aligning torque (SAT), a lateral force, and the like is small compared with that in the case of the movement through the turn. Thus, the steering angle commands for the coupling assistance can be highly accurately achieved, and accuracy of the coupling assistance increases.

Figure 3:
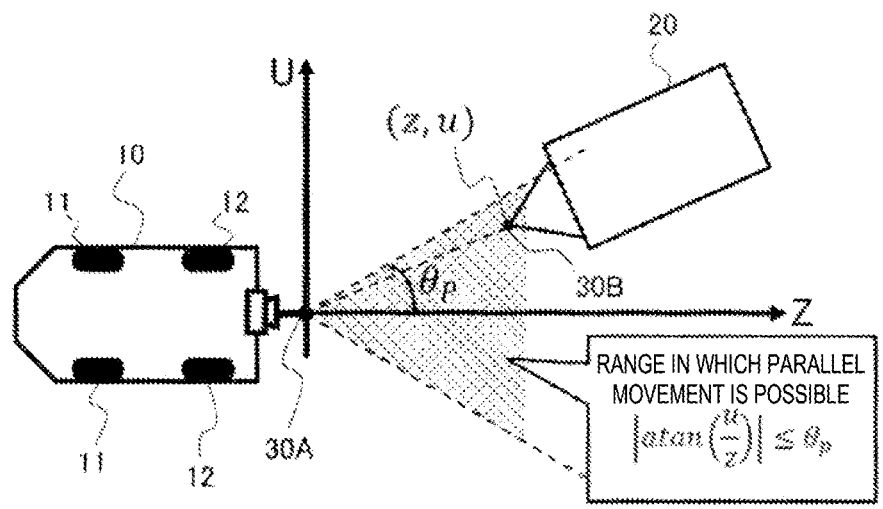
FIG. 3 is a diagram for illustrating an execution range of coupling assistance in a first steering angle control mode.

FIG. 3 is a diagram for illustrating selection processing for the steering angle control mode in the coupling assistance control, and is an illustration of a case in which the angle of the second coupling part 30B with respect to the first coupling part 30A, that is, the relative position of the second coupling part 30B with respect to the first coupling part 30A, corresponds to a selection region for the first steering angle control mode (parallel movement mode).

In FIG. 3, in a Cartesian coordinate system in which a front-and-rear direction of the vehicle 10 is assigned to a Z axis, a left-and-right direction of the vehicle 10 is assigned to a U axis, and the position of the first coupling part 30A of the vehicle 10 is assigned to the origin (reference position), the position of the second coupling part 30B is indicated by coordinates (z, u).

The coordinates (z, u) correspond to the physical quantity relating to the angle of the second coupling part 30B with respect to the first coupling part 30A. Moreover, the coordinates (z, u) correspond to a target position in the coupling assistance, and is also a physical quantity relating to the angle of the reference position of the vehicle with respect to the target position.

There are obtained, by Expression 1, command steering angles δf* and δr* required in order to move the first coupling part 30A to the coordinate values (z, u) indicating the position of the second coupling part 30B through the parallel movement provided by the four-wheel steering control in the first steering angle control mode.

$$\delta_r^* = \mathrm{atan}\left(\frac{u}{z}\right)$$
$$\delta_f^* = \delta_r^*$$

[Expression 1]

Meanwhile, a state in which the second coupling part 30B is positioned on a trajectory of the first coupling part 30A when the parallel movement is executed at the maximum steering angles of the front and rear wheels in the first steering angle control mode corresponds to a limit of the coupling through the parallel movement in the first steering angle control mode.

Moreover, in a region closer to the Z axis than the above-mentioned trajectory, that is, in a region in which the angle of the second coupling part 30B with respect to the first coupling part 30A is smaller, the first coupling part 30A can be displaced to the second coupling part 30B to couple the first coupling part 30A to the second coupling part 30B through the steering control in the first steering angle control mode within the variable range of the steering angles.

The steering angles of the front and rear wheels are the same in the first steering angle control mode. Thus, the maximum steering angle of the front and rear wheels in the first steering angle control mode is the maximum steered angle δ max being a smaller one of the maximum steered angle δf max (maximum steering angle) of the front wheels 11 and 11 and the maximum steered angle δr max (maximum steering angle) of the rear wheels 12 and 12 in terms of the absolute value.

In general, the maximum steered angle δr max of the rear wheels 12 and 12 is smaller than the maximum steered angle δf max of the front wheels 11 and 11. Thus, the maximum δ max of the steering angles of the front and rear wheels in the first steering angle control mode is the maximum steered angle δr max of the rear wheels 12 and 12, and a coupling possible region in the first steering angle control mode is determined based on the maximum steered angle δr max of the rear wheels 12 and 12.

The steering control device 40 stores, in the memory, an upper limit steering angle θp (upper limit steering angle θp≤δ max) which is set based on the maximum δ max of the steering angles of the front and rear wheels in the first steering angle control mode, and which enables the coupling to be achieved through the parallel movement in the first steering angle control mode.

Moreover, when the angle of the second coupling part 30B with respect to the first coupling part 30A is equal to the upper limit steering angle θp or smaller than the upper limit steering angle θp, the steering control device 40 determines that the coupling can be achieved through the parallel movement in the first steering angle control mode.

That is, when the coordinate values (z, u) indicating the position of the second coupling part 30B satisfy Expression 2, the steering control device 40 determines that the coupling can be achieved through the parallel movement in the first steering angle control mode.

$$\left|\mathrm{atan}\left(\frac{u}{z}\right)\right| \le \theta_p \quad \text{[Expression 2]}$$

When the coordinate values (z, u) indicating the position of the second coupling part 30B satisfy Expression 2, that is, the coordinate values (z, u) are within the range in which the coupling is possible through the parallel movement, the steering control device 40 selects the first steering angle control mode.

After that, the steering control device 40 outputs, to the front-wheel steering device 13 and the rear-wheel steering device 14, the command steering angles δf* and δr* obtained by Expression 1 as the steering angle control commands for the four-wheel steering control in the first steering angle control mode.

Meanwhile, when the coordinate values (z, u) indicating the position of the second coupling part 30B do not satisfy Expression 2, that is, the coordinate values (z, u) deviate from the range in which the coupling is possible through the parallel movement, the steering control device 40 selects the second steering angle control mode.

After that, the steering control device 40 obtains steering angle control commands for the control in the second steering angle control mode so that the coordinate values (z, u) indicating the position of the second coupling part 30B reach a position satisfying Expression 2, and outputs the obtained steering angle control commands to the front steering device 13 and the rear steering device 14.

Figure 4:
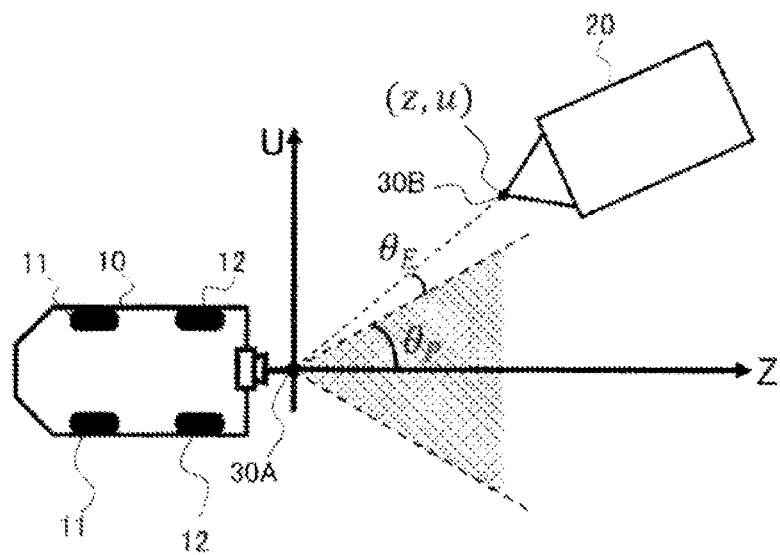
FIG. 4 is a diagram for illustrating a target rotation angle θE in a second steering angle control mode.

FIG. 4 is a diagram for illustrating correlation between a target rotation angle θE used when the vehicle 10 is rotated in the second steering angle control mode and the angle θp defining the range of the coupling achievable through the parallel movement.

The target rotation angle θE is obtained by Expression 3.

$$\theta_E = \mathrm{atan}\left(\frac{u}{z}\right) - \theta_p \cdots \text{When } \left|\mathrm{atan}\left(\frac{u}{z}\right)\right| > \theta_p \quad \text{[Expression 3]}$$
$$\theta_E = 0 \cdots \text{Other}$$

That is, when the coordinate values (z, u) indicating the position of the second coupling part 30B do not satisfy Expression 2, the steering control device 40 executes the steering control in the second steering angle control mode, to thereby rotate the vehicle 10 by an amount corresponding to deviation from the angle θp. Then, when the positional relationship satisfying Expression 2 is consequently achieved, the steering control part 40 switches the second steering angle control mode to the first steering angle control mode, to thereby move the vehicle 10 in parallel so that the first coupling part 30A is moved to the position of the second coupling part 30B.

When the first coupling part 30A is moved to the coupling position through the parallel movement in the first steering angle control mode, the influence of the self-aligning torque, the lateral force, and the like is suppressed, thereby being capable of reducing the errors of the movement of the wheels with respect to the steering angle commands, resulting in an increase in the accuracy of the coupling assistance for leading to the coupling position.

A more detailed description is now given of the four-wheel steering control executed by the steering control device 40 with reference to a flowchart.

First Embodiment

Figure 5:
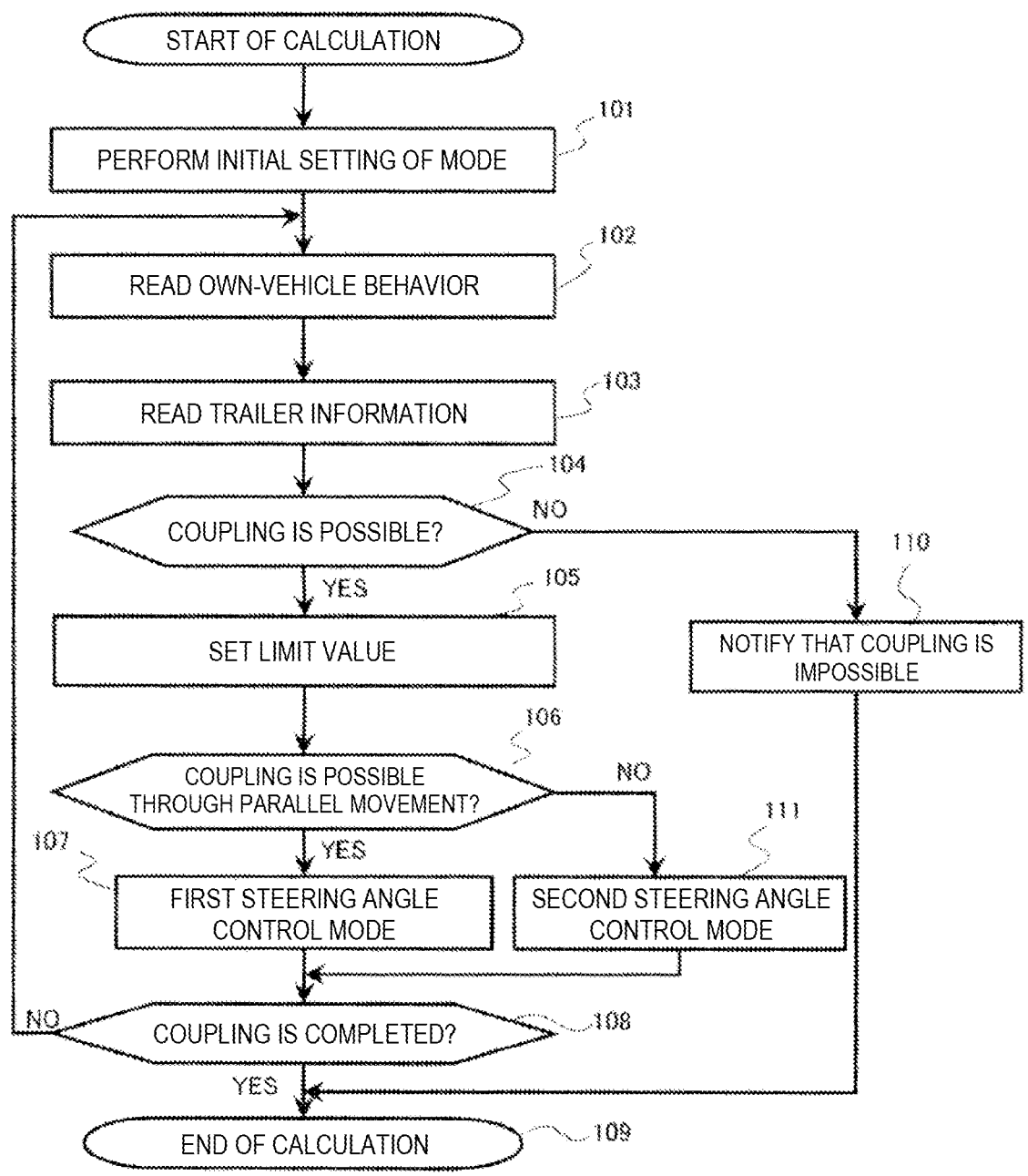
FIG. 5 is a flowchart for illustrating a procedure of mode selection of coupling assistance control in a first embodiment of the present invention.

FIG. 5 is a flowchart for illustrating selection processing for the steering angle control mode of the coupling assistance control by the steering control device 40 in a first embodiment of the present invention.

In Step S101, the steering control device 40 executes initial setting of setting a variable CMDMODE indicating which of the first steering angle control mode and the second steering angle control mode is selected as the steering angle control mode to "2."

When the variable CMDMODE is 1, the variable CMDMODE indicates the selection state of the first steering angle control mode. When the variable CMDMODE is 2, the variable CMDMODE indicates the selection state of the second steering angle control mode.

As described above, the first steering angle control mode is the steering angle control mode (that is, parallel movement mode) in which the steering angle δf of the front wheels 11 and 11 and the steering angle δr of the rear wheels 12 and 12 are controlled to achieve the same steering angle.

Further, the second steering angle control mode is the steering angle control mode (that is, rotational movement mode) in which the steering angle δf of the front wheels 11 and 11 and the steering angle δr of the rear wheels 12 and 12 are controlled to achieve different steering angles.

In Step S102, the steering control device 40 reads vehicle information being information relating to a behavior of its own vehicle. The vehicle information includes a speed V of the rear wheels 12 and 12, information on the steering angles δf and δr, and the like.

In Step S103, the steering control device 40 reads, from the external world recognition unit 61, information on the positional relationship between the first coupling part 30A and the second coupling part 30B.

Figure 6:
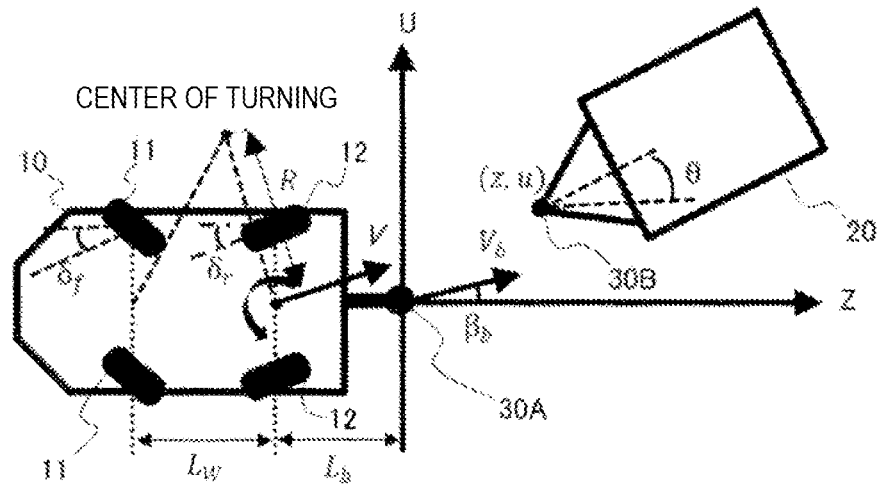
FIG. 6 is a diagram for illustrating various physical quantities including vehicle specification information to be used for the coupling assistance control.

The information on the positional relationship between the first coupling part 30A and the second coupling part 30B includes, for example, the coordinate value "z" indicating the distance between the first coupling part 30A and the second coupling part 30B in the Z axis direction being the front-and-rear direction of the vehicle 10, the coordinate value "u" indicating the distance between the first coupling part 30A and the second coupling part 30B in the U axis direction being the left-and-right direction of the vehicle 10, and a yaw angle θ of the trailer 20, which are illustrated in FIG. 6.

In FIG. 6, Lw represents a wheelbase length of the vehicle 10, Lb represents a distance from a center of a rear wheel axle to the first coupling part 30A, R represents a turning radius of the vehicle 10, Vb represents a speed of the first coupling part 30A, and βb represents a slip angle of the first coupling part 30A being an angle formed between a speed vector of the first coupling part 30A and the Z axis.

Moreover, the yaw angle θ of the trailer 20 is an angle formed between the Z axis being the front-and-rear direction of the vehicle 10 and a front-and-rear direction of the trailer 20, and is the physical quantity relating to a relative yaw angle of the trailer 20 with respect to the vehicle 10.

The configuration is not limited to the system in which the vehicle 10 includes the external world recognition unit 61, and the external world recognition unit 61 including a camera and the like may be installed at a place other than the vehicle 10.

For example, the system may be, for example, a system in which a camera forming the external world recognition unit 61 is mounted to a fixture such as a garage, a building, or a road illumination light around a place in which the coupling operation between the vehicle 10 and the trailer 20 is to be executed, and the steering control device 40 wirelessly receives the external world information acquired by the camera.

In the case in which the camera (external world recognition unit 61) is installed on the fixture, when the camera is installed at a high place of the fixture and is directed downward so that vehicle bodies of the vehicle 10 and the trailer 20 together with the coupling parts 30A and 30B are taken by the camera, it is possible to increase accuracy of the detection of the coordinate values (z, u) indicating the position of the second coupling part 30B and the yaw angle θ of the trailer 20 compared with the case in which the camera is installed in the rear part of the vehicle 10.

Moreover, both of the camera installed on the vehicle 10 and the camera installed on the fixture may be used for the external world recognition. Further, a plurality of cameras may be installed on the vehicle 10 and/or the fixture.

In Step S104 (coupling possibility determination unit), the steering control device 40 determines whether or not the first coupling part 30A and the second coupling part 30B can be coupled to each other through the four-wheel steering control based on the coordinate (z, u) of the second coupling part 30B.

The steering control device 40 determines that the coupling is possible when the absolute value of the coordinate value "u" is the absolute value of the maximum displacement amount U max or is equal to or smaller than the maximum displacement amount U max (|u|≤|U max|).

The maximum displacement amount U max is the maximum displacement amount in the U axis direction when the first coupling part 30A moves in the Z axis direction by the coordinate value "z", that is, by the relative distance between the first coupling part 30A and the second coupling part 30B in the Z axis direction.

The steering control device 40 calculates the maximum displacement amount U max as given by Expression 4.

$$Umax = z \cdot \beta max + \frac{z^2}{2 \cdot Rmin} \qquad \text{[Expression 4]}$$

In Expression 4, βmax represents the maximum slip angle of the first coupling part 30A, and Rmin represents the minimum turning radius of the first coupling part 30A. Moreover, the maximum slip angle βmax and the minimum turning radius Rmin are values obtained when the steering angle δf of the front wheels 11 and 11 are set to the maximum steered angle, and the steering angle δr of the rear wheels 12 and 12 is set to the maximum steered angle toward the opposite direction to that of the front wheels 11 and 11.

That is, when |u|=|U max|, the steering control device 40 sets the steering angle δf of the front wheels 11 and 11 to the maximum steered angle, and sets the steering angle δr of the rear wheels 12 and 12 to the maximum steered angle toward the opposite direction to that of the front wheels 11 and 11, thereby being capable of displacing the first coupling part 30A to the position of the second coupling part 30B.

Thus, when |u|≤|U max|, the steering control device 40 determines that the first coupling part 30A can be coupled to the second coupling part 30B.

Meanwhile, when |u|>|U max|, even the steering control device 40 sets the steering angle δf of the front wheels 11 and 11 to the maximum steered angle, and sets the steering angle δr of the rear wheels 12 and 12 to the maximum steered angle toward the opposite direction to that of the front wheels 11 and 11, the first coupling part 30A cannot be displaced to the position of the second coupling part 30B.

Thus, when |u|>|U max|, the steering control device 40 determines that the first coupling part 30A cannot be coupled to the second coupling part 30B.

In the vehicle 10 including the four-wheel steering system, the maximum slip angle βmax is large, the minimum turn radius Rmin is small, and the maximum displacement amount U max is large compared with a front-wheel steering vehicle. Thus, the range in which the coupling is possible through the steering control is wide.

Moreover, the steering control device 40 determines the possibility of the coupling while considering the maximum displacement amount U max at an extremely low speed of the vehicle 10 including the four-wheel steering system as a limit value, and can thus provide the coupling assistance in a range as wide as possible.

When |u|≤|U max| and the coupling is possible, in Step S105, the steering control device 40 sets the upper limit steering angle θp (see FIG. 3 and FIG. 4) being the steering angle limit value in the first steering angle control mode as given by Expression 5 in accordance with the variable CMDMODE.

$$\theta p = \begin{cases} \delta_{ULM} \cdots \text{when } CMDMODE = 1 \\ \delta_{DLM} \cdots \text{when } CMDMODE = 2 \end{cases} \qquad \text{[Expression 5]}$$

An upper limit steering angle δULM (δULM>0 [deg]) selected when the variable CMDMODE is 1 is an angle set based on a smaller maximum steered angle (the maximum steered angle of the rear wheels 12 and 12 in general) of the maximum steered angle of the front wheels 11 and 11 and the maximum steered angle of the rear wheels 12 and 12.

Moreover, an upper limit steering angle δDLM (δDLM>0 [deg]) selected when the variable CMDMODE is 2 is set to a value smaller than the upper limit steering angle δULM, and is, for example, δDLM=δULM−1 [deg].

That is, the upper limit steering angle δULM used to determine the transition from the first steering angle control mode to the second steering angle control mode is larger than the upper limit steering angle δDLM used to determine the transition from the second steering angle control mode to the first steering angle control mode, to thereby provide hysteresis for the determination of switching between the steering angle control modes.

As a result, in the selection processing for the steering angle control mode, hunting can be suppressed between the first steering angle control mode and the second steering angle control mode, thereby being capable of suppressing instability of the steering control around the upper limit steering angle θp.

After that, in Step S106, the steering control device 40 determines whether or not the first coupling part 30A can be coupled to the second coupling part 30B through the parallel movement in the first steering angle control mode.

That is, the steering control device 40 determines whether or not the relationship given by Expression 2 is satisfied based on the upper limit steering angle θp set in Step S105 and information on the coordinate values (z, u) indicating the position of the second coupling part 30B acquired from the external world recognition unit 61.

Moreover, when the relationship given by Expression 2 is satisfied, and the position of the second coupling part 30B is thus within the range in which the coupling through the parallel movement can be achieved, the steering control device 40 determines that the first coupling part 30A can be coupled to the second coupling part 30B through the parallel movement in the first steering angle control mode, and the process proceeds to Step S107 (target steering amount calculation unit).

Meanwhile, when the relationship given by Expression 2 is not satisfied, and the coupling through the parallel movement is thus impossible, the steering control device 40 determines that it is required to rotate the vehicle 10 in the second steering angle control mode to move the vehicle 10 into the range in which the coupling can be achieved in the first steering angle control mode, and the process proceeds to Step S111 (target steering amount calculation unit).

In other words, the steering control device 40 selects the first steering angle control mode when the position of the second coupling part 30B is within the range in which the coupling through the parallel movement can be achieved, and the process proceeds to Step S107. Meanwhile, the steering control device 40 selects the second steering angle control mode when the position of the second coupling part 30B is not within the range in which the coupling through the parallel movement can be achieved, and the process proceeds to Step S111.

In Step S107, the steering control device 40 calculates the steering angle control commands for the front and rear wheels for the control in the first steering angle control mode. A detailed description is below given of details of processing of Step S107 with reference to a flowchart of FIG. 7.

In Step S111, the steering control device 40 calculates the steering angle control commands for the front and rear wheels for the control in the second steering angle control mode. A detailed description is below given of details of processing of Step S111 with reference to a flowchart of FIG. 8.

In Step S108, the steering control device 40 determines whether or not the coupling between the first coupling part 30A and the second coupling part 30B has been completed.

For example, the steering control device 40 determines that the coupling has been completed when the position "z" of the second coupling part 30B in the Z axis direction satisfies a relationship of "z≤0", that is, when the steering control device 40 detects that the position of the first coupling part 30A has been displaced to the position of the second coupling part 30B.

When the steering control device 40 determines that the coupling has been completed, in Step S109, the steering control device 40 finishes the coupling assistance control through the four-wheel steering.

Meanwhile, when the steering control device 40 determines that the coupling has not been completed, the process returns to Step S102, and the steering control device 40 continues the coupling assistance control through the automatic control for the steering angles of the front and rear wheels.

Moreover, when the steering control device 40 determines that the second coupling part 30B cannot be coupled to the first coupling part 30A through the four-wheel steering control (coupling is impossible) in Step S104, the process proceeds to Step S110.

In Step S110, the steering control device 40 outputs, to the HMI device 42, a command for notifying the driver of the state in which the coupling cannot be achieved due to the current positional relationship between the vehicle 10 and the trailer 20.

The HMI device 42 notifies, based on the command, the driver, for example, by displaying a warning sentence, or turning on the lamp, that the coupling cannot be achieved through the coupling assistance provided by the four-wheel steering control.

The HMI device 42 notifies that the coupling is impossible, and can also notify the driver of advice that relates to a driving operation for achieving the coupling, and indicates, for example, that it is required to move the vehicle 10 away more from the trailer 20 in order to achieve the coupling.

Figure 7:
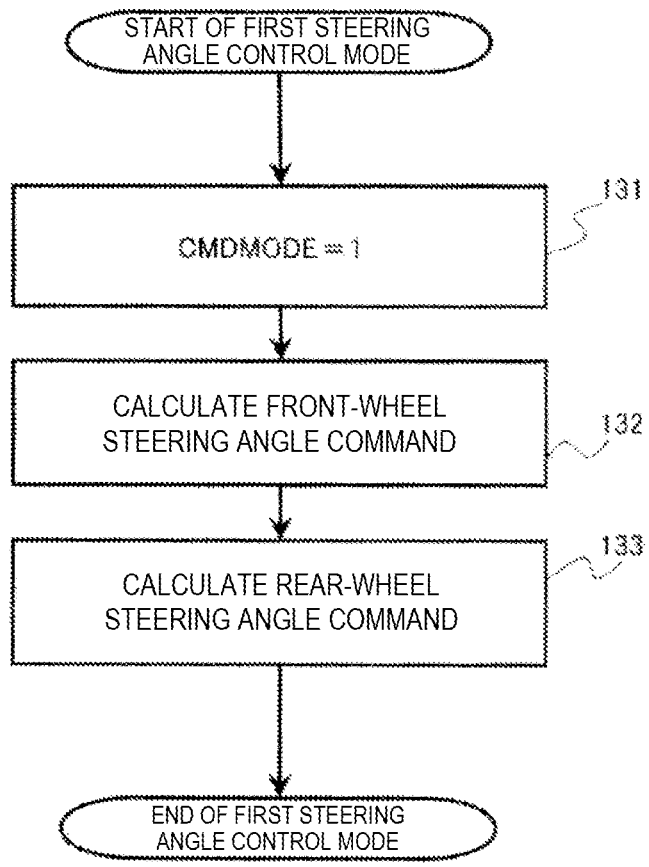
FIG. 7 is a flowchart for illustrating a processing procedure in the first steering angle control mode in the first embodiment.

The detailed description is now given of the details of processing of Step S107 of FIG. 5 with reference to the flowchart of FIG. 7.

The steering control device 40 executes the coupling assistance through the four-wheel steering control in the first steering angle control mode, and thus sets the variable CMDMODE to "1" in Step S131.

After that, in Step S132, the steering control device 40 obtains the front-wheel command steering angle δf* (front-wheel steering angle control command) based on the coordinate values (z, u) indicating the position information on the second coupling part 30B as given by Expression 6, and outputs the obtained front-wheel command steering angle δf* to the actuator control unit 41.

$$\delta_f^* = \operatorname{atan}\left(\frac{u}{z}\right) \qquad \text{[Expression 6]}$$

Moreover, in Step S133, the steering control device 40 sets the rear-wheel command steering angle δr* (rear-wheel steering angle control command) to the same angle as the front-wheel command steering angle δf* (δf*=δr*), and outputs the rear-wheel command steering angle δr* to the actuator control unit 41.

The state in which the front-wheel command steering angle δf* and the rear-wheel command steering angle δr* are the same is an in-phase state in which the front wheels 11 and 11 and the rear wheels 12 and 12 are steered by the same angle toward the same direction, and the vehicle 10 thus moves in parallel.

When the four-wheel steering control in the first steering angle control mode in which the vehicle 10 moves in parallel is not applied, the influence of the self-aligning torque, the lateral force, and the like which occur due to the rotation of the vehicle 10 increases, and the errors in movement of the front and rear wheels with respect to the steering angle commands are liable to increase. Thus, the coupling accuracy decreases.

Meanwhile, in the four-wheel steering control in the first steering angle control mode in which the vehicle 10 moves in parallel, the vehicle 10 does not rotate. Thus, the slip angle does not occur in the vehicle 10, and the self-aligning torque being a restoring force of canceling the slip angle is not generated.

Moreover, in the four-wheel steering control in the first steering angle control mode in which the vehicle 10 moves in parallel, the rotation of the vehicle 10 does not occur, and thus the lateral forces are not constantly generated in the tires.

Thus, in the four-wheel steering control in the first steering angle control mode in which the vehicle 10 moves in parallel, the influence of the interference relating to the steering can greatly be reduced, and the errors in the movement of the wheels with respect to the steering angle commands can be reduced. Thus, the coupling accuracy increases.

Figure 8:
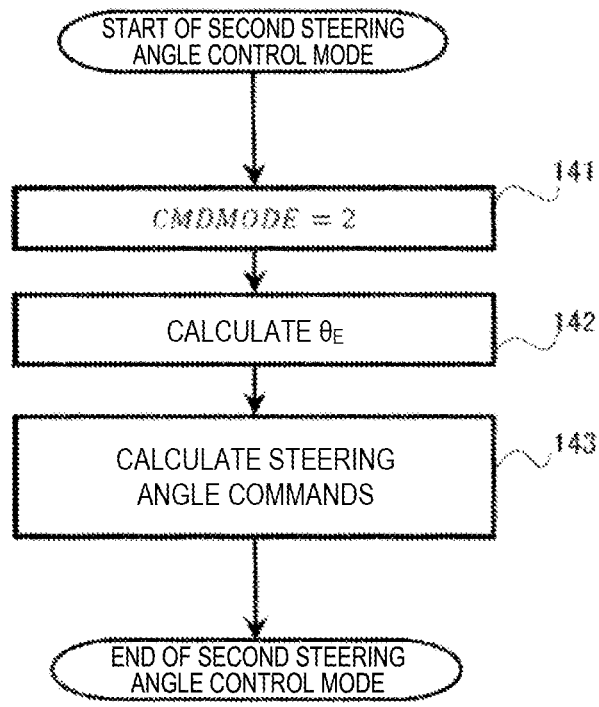
FIG. 8 is a flowchart for illustrating a processing procedure in the second steering angle control mode in the first embodiment.

The detailed description is now given of the details of processing of Step S111 of FIG. 5 with reference to the flowchart of FIG. 8.

The steering control device 40 executes the coupling assistance through the four-wheel steering control in the second steering angle control mode, and thus sets the variable CMDMODE to "2" in Step S141.

After that, in Step S142, the steering control device 40 calculates the target rotation angle θE (see FIG. 4) in the second steering angle control mode as given by Expression 7. The target rotation angle θE is the target rotation angle required for the four-wheel steering control in the second steering angle control mode to bring about the state in which the coupling can be achieved through the parallel movement in the first steering angle control mode.

$$\theta_E = \operatorname{atan}\left(\frac{u}{z}\right) - \theta_p \frac{u}{|u|} \quad \text{[Expression 7]}$$

The coordinate value "u" of Expression 7 is a positive value or a negative value, while θp is a positive constant value set based on Expression 5, and thus a term of "u/|u|" is provided so as to match the signs of the angles with each other.

In Step S143, the steering control device 40 calculates the front-wheel command steering angle δf and the rear-wheel command steering angle δr*.

Figure 9:
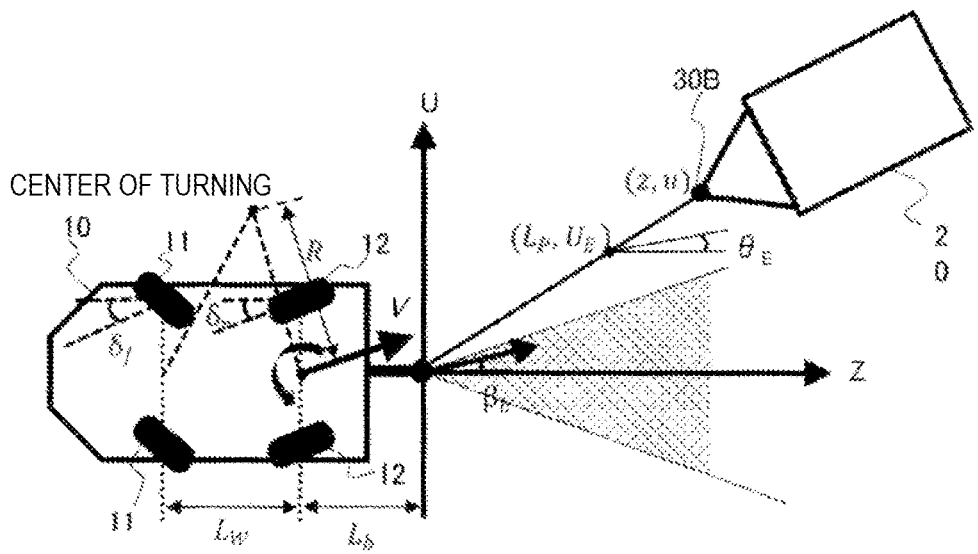
FIG. 9 is a diagram for illustrating calculation of steering angle control commands in the second steering angle control mode.

FIG. 9 is a diagram for illustrating one aspect of a calculation method for the steering angle control commands in the second steering angle control mode in Step S143.

The steering control device 40 calculates, as given by Expression 8, a target lateral movement amount UE in the U axis direction required to position the first coupling part 30A on a line connecting the coordinate values (0, 0) being the current position of the first coupling part 30A and the coordinate values (z, u) indicating the position of the second coupling part 30B to each other when the first coupling part 30A moves from the coordinate values (0, 0) being the current position toward the Z axis direction by a preview distance LP.

The preview distance LP is a positive predetermined value (LP>0 m), and can be set to from approximately 0.5 m to approximately 1.0 m being a travel distance at the time when the vehicle 10 travels, for example, for one second at an average travel speed under the coupling state.

$$U_E = \left(\frac{u}{z}\right) * L_P \quad \text{[Expression 8]}$$

After that, the steering control device 40 calculates the front-wheel command steering angle δf* and the rear-wheel command steering angle δr* in the second steering angle control mode based on the target lateral movement amount UE obtained as given by Expression 8 and the target rotation angle θE obtained in Step S142, and outputs the calculated steering angle control commands to the actuator control unit 41.

In the second steering angle control mode, in order to achieve the target rotation angle θE, the front-wheel command steering angle δf* and the rear-wheel command steering angle δr* are set to steering angles different from each other.

When there is brought about the state in which the coupling can be achieved through the parallel movement as a result of the steering control in the second steering angle control mode, the steering control device 40 transitions from the second steering angle control mode to the first steering angle control mode, and couples the first coupling part 30A to the second coupling part 30B under the parallel movement state.

As described above, in the coupling assistance control executed by the steering control device 40, the coupling assistance can highly accurately be executed while the calculation processing is simple.

That is, when the positional relationship between the vehicle 10 and the trailer 20 is within the range in which the coupling can be achieved through the parallel movement, the steering control device 40 executes the steering control in the first steering angle control mode, thereby being capable of reducing the influence of the interference such as the self-aligning and the lateral force, resulting in the increase in coupling accuracy.

Moreover, when the positional relationship between the vehicle 10 and the trailer 20 is not within the range in which the coupling can be achieved through the parallel movement, the steering control device 40 executes the steering control in the second steering angle control mode, thereby being capable of extending the range in which the coupling assistance can be applied.

Second Embodiment

Description is now given of coupling assistance control in a second embodiment of the present invention in which a condition that the coupling can be achieved through the parallel movement and the vehicle 10 and the trailer 20 are aligned substantially straight at the time of the coupling through the parallel movement is the selection condition for the first steering angle control mode.

Figure 10:
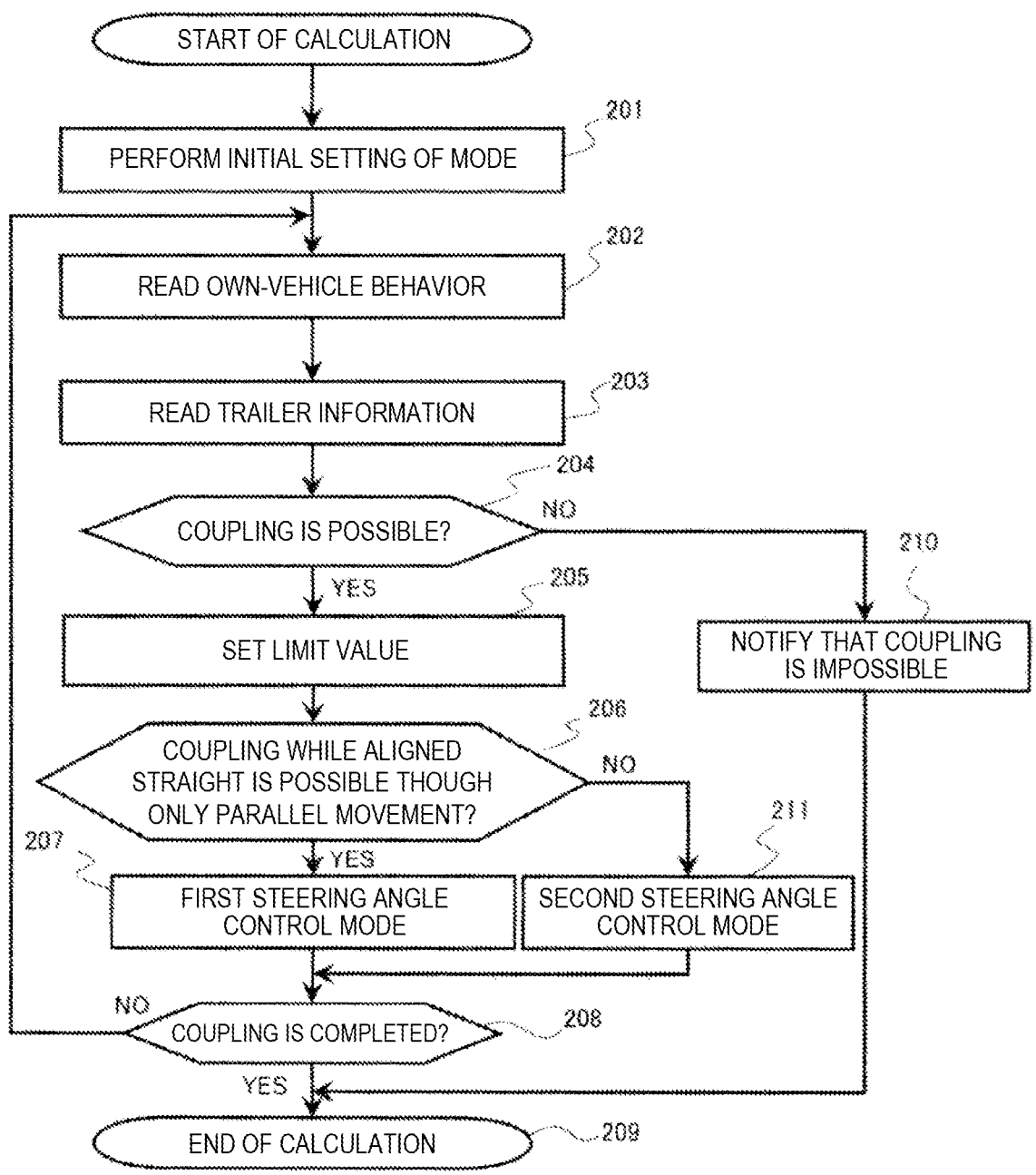
FIG. 10 is a flowchart for illustrating a procedure of mode selection of coupling assistance control in a second embodiment of the present invention.

FIG. 10 is a flowchart for illustrating selection processing for the steering angle control mode in the second embodiment.

In Step S201 to Step S205 of the flowchart of FIG. 10, the steering control device 40 executes the same processing as that of Step S101 to Step S105 of the flowchart of FIG. 5, and a detailed description thereof is therefore omitted.

In Step S206, the steering control device 40 determines, based on the information acquired from the external world recognition unit 61, whether or not the first coupling part 30A can be coupled to the second coupling part 30B through the parallel movement in the first steering angle control mode, and the vehicle 10 and the trailer 20 are aligned substantially straight when the coupling is achieved through the parallel movement.

In Step S206, the steering control device 40 determines whether or not the relationship given by Expression 2 is satisfied, and the absolute value of the yaw angle θ (see FIG. 6) of the trailer 20 is equal to an allowable angle θtlr (θtlr>0 deg) or smaller than the allowable angle θtlr, and thus satisfies a relationship given by Expression 9.

$$|\theta| \le \theta_{tlr}  \quad\text{[Expression 9]}$$

That is, when the vehicle 10 is moved in parallel in the first steering angle control mode, the yaw angle θ of the trailer 20 at the start of the parallel movement directly becomes the yaw angle θ at the time when the coupling is achieved.

Thus, the determination of whether the yaw angle θ of the trailer 20 is equal to or smaller than the allowable angle θtlt corresponds to determination of whether or not the vehicle 10 and the trailer 20 are aligned substantially straight at the time of the coupling.

The allowable angle θtlr is set to, for example, approximately 5 degrees based on an angle (resolution) at which recognition accuracy is secured in the external world recognition unit 61.

When the first coupling part 30A can be coupled to the second coupling part 30B through the parallel movement of the vehicle 10 in the first steering angle control mode, and the vehicle 10 and the trailer 20 are aligned substantially straight at the time of the coupling, the process proceeds to Step S207. Then, the steering control device 40 selects the first steering angle control mode, and obtains the steering angle control commands.

Meanwhile, when, there is not satisfied the condition that the coupling can be achieved through the parallel movement and the vehicle 10 and the trailer 20 are aligned substantially straight at the time of the coupling, the process proceeds to Step S211. Then, the steering control device 40 selects the second steering angle control mode, and obtains the steering angle control commands.

In Step S208 to Step S210 of the flowchart of FIG. 10, the steering control device 40 executes the same processing as that of Step S108 to Step S110 of the flowchart of FIG. 5, and a detailed description thereof is therefore omitted.

According to the second embodiment, the condition that the vehicle 10 and the trailer 20 are aligned substantially straight at the time of the coupling is set as the selection condition for the first steering angle control mode. Thus, there is obtained an effect that it is possible to suppress, for example, a state in which the vehicle 10 goes out of a parking frame (parking space) when the vehicle 10 is coupled to the trailer 20 placed in the parking frame and that a driving operation becomes easier when the vehicle starts to travel after the coupling.

Figure 11:
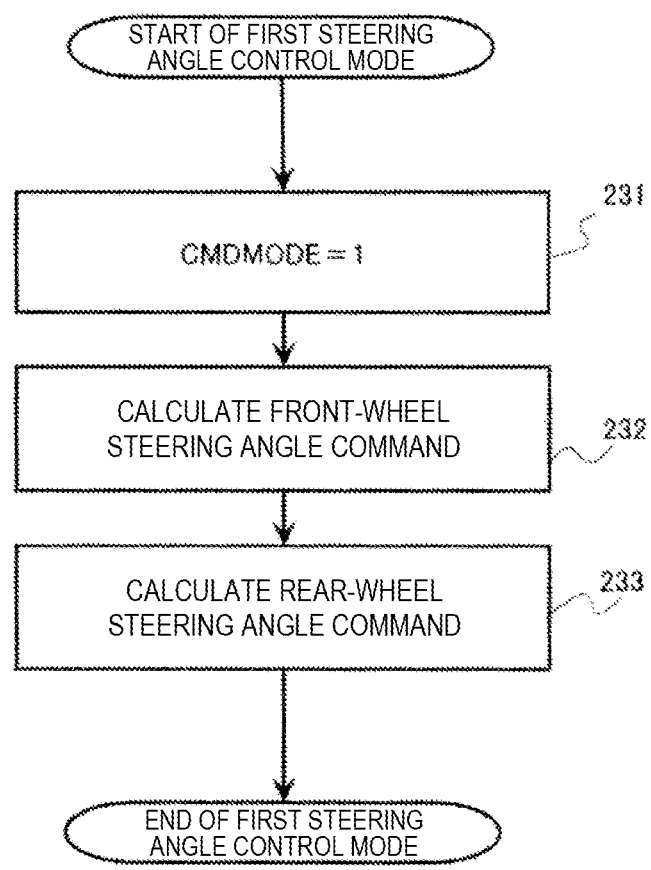
FIG. 11 is a flowchart for illustrating a processing procedure in the first steering angle control mode in the second embodiment.

The flowchart of FIG. 11 shows details of processing of Step S207 of FIG. 10.

In Step S231, the steering control device 40 sets the variable CMDMODE to "1".

After that, in Step S232, the steering control device 40 obtains the front-wheel command steering angle δf* (front-wheel steering angle control command) based on the coordinate values (z, u) indicating the position information on the second coupling part 30B as given by Expression 6, and outputs the obtained front-wheel command steering angle δf* to the actuator control unit 41.

Moreover, in Step S233, the steering control device 40 sets the rear-wheel command steering angle δr* (rear-wheel steering angle control command) to the same angle as the front-wheel command steering angle δf* (δf*=δr*), and outputs the rear-wheel command steering angle δr* to the actuator control unit 41.

In Step S207, as the condition for obtaining the steering angle control commands in the first steering angle control mode, there is added the condition that the vehicle 10 and the trailer 20 are aligned substantially straight at the time of the coupling through the parallel movement, and the vehicle 10 and the trailer 20 are consequently aligned substantially straight at the time of the coupling by controlling the front and rear wheels at the steering angles obtained based on the coordinate values (z, u) indicating the position information on the second coupling part 30B as in the first embodiment.

Figure 12:
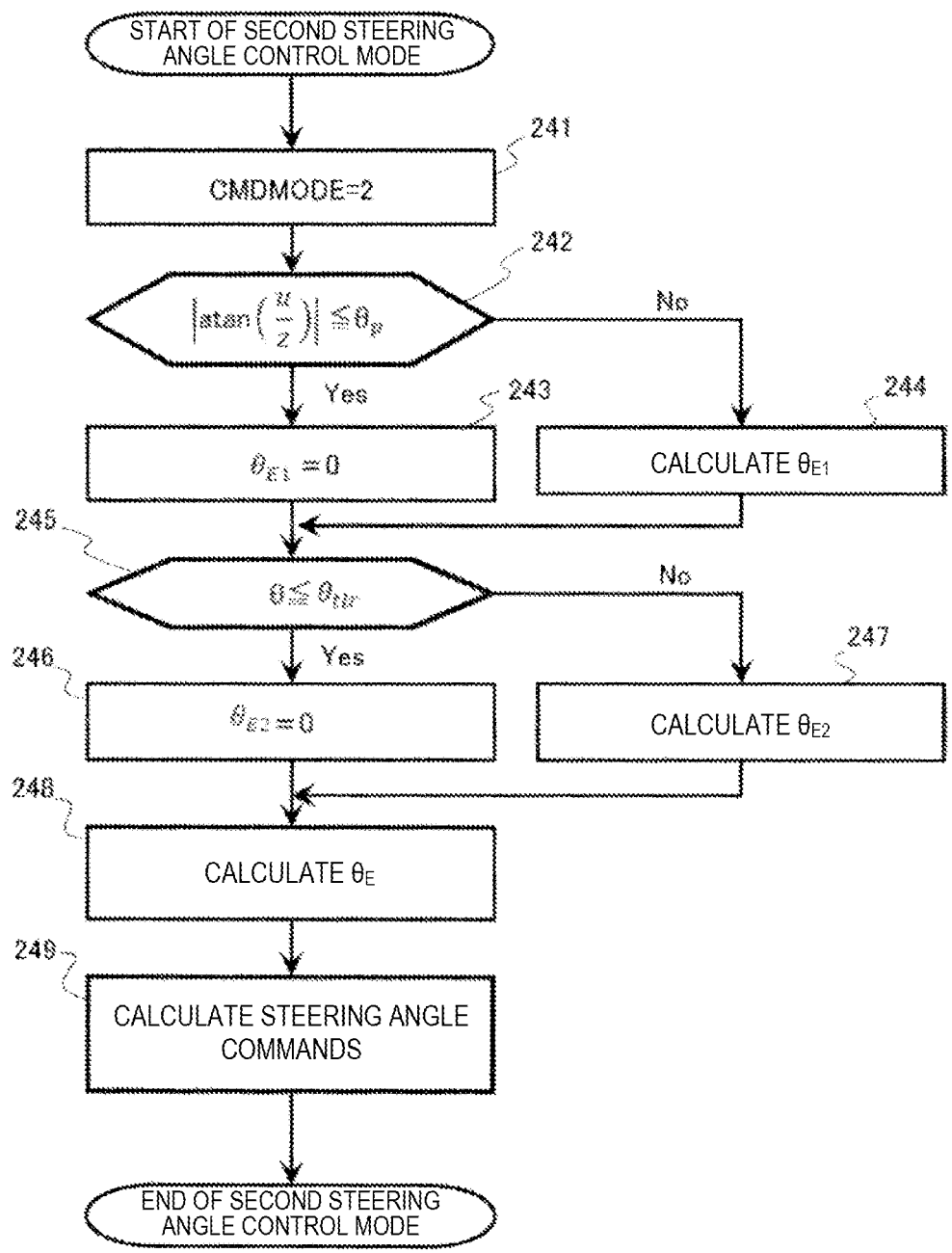
FIG. 12 is a flowchart for illustrating a processing procedure in the second steering angle control mode in the second embodiment.

The flowchart of FIG. 12 shows details of processing of Step S211 of FIG. 10.

In Step S241, the steering control device 40 first sets the variable CMDMODE to "2".

After that, in Step S242, the steering control device 40 determines, based on whether or not Expression 2 is satisfied, whether or not the first coupling part 30A is within the range in which the first coupling part 30A can be moved to the second coupling part 30B through the parallel movement of the vehicle 10.

In the second embodiment, when there is satisfied the condition that the coupling can be achieved through the parallel movement and the vehicle 10 and the trailer 20 are aligned substantially straight at the time of the coupling, the four-wheel steering control in the first steering angle control mode is executed. Thus, also when the coupling can be achieved through the parallel movement, but the vehicle 10 and the trailer 20 are not aligned substantially straight at the time of the coupling, the process proceeds to Step S211.

As a result, in Step S242, the steering control device 40 again determines whether or not the coupling can be achieved through the parallel movement.

When the coupling can be achieved through the parallel movement of the vehicle 10 (when Expression 2 is satisfied), that is, the coupling can be achieved through the parallel movement, but the vehicle 10 and the trailer 20 are not aligned substantially straight at the time of the coupling, the process proceeds to Step S243.

Figure 13:
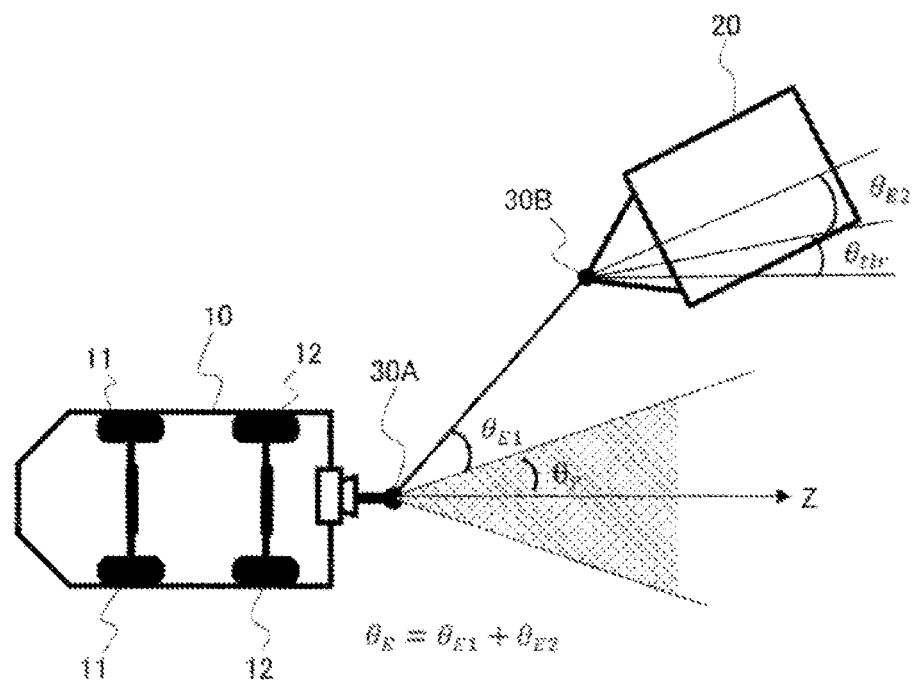
FIG. 13 is a diagram for illustrating the target rotation angle in the second steering angle control mode in the second embodiment.

In Step S243, the steering control device 40 sets zero as a target rotation angle θE1 (see FIG. 13) for bringing about the state in which the coupling can be achieved through the parallel movement of the vehicle 10.

The current state is the state in which the coupling can be achieved through the parallel movement and thus satisfies Expression 2, and the rotation of the vehicle 10 in order to bring about the state satisfying Expression 2 is not required. Thus, in Step S243, the steering control device 40 sets the target rotation angle θE1 to 0 degrees.

Meanwhile, when Expression 2 is not satisfied, the process proceeds to Step S244, and the steering control device 40 calculates, as given by Expression 7 described above, the target rotation angle θE1 of the vehicle 10 for bringing about the state in which the coupling can be achieved through the parallel movement.

After that, in Step S245, the steering control device 40 determines whether or not the absolute value of the yaw angle θ of the trailer 20 is equal to or smaller than the allowable angle θtlr (whether or not Expression 9 is satisfied).

When the absolute value of the yaw angle θ of the trailer 20 is equal to the allowable angle θtlr or smaller than the allowable angle θtlr, the process proceeds to Step S246, and the steering control device 40 sets, to zero, a target rotation angle θE2 (see FIG. 13) for aligning the vehicle 10 and the trailer 20 substantially straight at the time of the coupling.

The current state is the state in which Expression 9 is satisfied, and the rotation of the vehicle 10 is thus not required to align the vehicle 10 and the trailer 20 substantially straight at the time of the coupling. Accordingly, in Step S246, the steering control device 40 sets the target rotation angle θE2 to 0 degrees.

Meanwhile, when the absolute value of the yaw angle θ of the trailer 20 is larger than the allowable angle θtlr, the process proceeds to Step S247, and the steering control device 40 calculates the target rotation angle θE2 for causing the absolute value of the yaw angle θ of the trailer 20 to achieve the allowable angle θtlr as given by Expression 10.

In Expression 10, the term "u/|u|" is provided so as to match the signs of the angles with each other.

$$\theta_{E2} = \theta - \theta_{tlr} \frac{u}{|u|}$$ [Expression 10]

After that, in Step S248, the steering control device 40 calculates the final target rotation angle θE in the second steering angle control mode as given by Expression 11 based on the target rotation angle θE1 for bringing about the state in which the coupling can be achieved through the parallel movement and the target rotation angle θE2 for aligning the vehicle 10 and the trailer 20 substantially straight at the time of the coupling.

$$\theta_E = \theta_{E1} + \theta_{E2}$$ [Expression 11]

After that, in Step S249, as in Step S143, the steering control device 40 calculates the front-wheel command steering angle δf* and the rear-wheel command steering angle δr* in the second steering angle control mode based on the target lateral movement amount UE obtained as given by Expression 8 described above and the target rotation angle θE obtained in Step S248, and outputs the calculated steering angle control commands to the actuator control unit 41.

According to the second embodiment, the steering control device 40 controls the steering angles of the front and rear wheels in the first steering angle control mode when the vehicle 10 and the trailer 20 can be coupled substantially straight through the parallel movement.

Meanwhile, when the vehicle 10 and the trailer 20 cannot be coupled substantially straight through the parallel movement, the steering control device 40 controls the steering angles of the front and rear wheels in the second steering angle control mode based on the target rotation angle θE1 for bringing about the state in which the coupling can be achieved through the parallel movement of the vehicle 10 and the target rotation angle θE2 for aligning the vehicle 10 and the trailer 20 substantially straight at the time of the coupling.

Thus, the influence of the interference such as the self-aligning torque and the lateral force is suppressed, thereby being capable of increasing the accuracy of the coupling assistance, and the vehicle 10 and the trailer 20 can be aligned substantially straight at the time of the coupling.

Third Embodiment

Description is now given of, as a third embodiment of the present invention, coupling assistance through automatic control of the rear-wheel steering angle when a steering angle command based on the operation (steering operation) of the steering wheel 13B by the driver is input to the front-wheel steering device 13, that is, the steering angle of the front wheels 11 and 11 is controlled through a manual operation by the driver.

When the driver does not execute the operation of the steering wheel 13B, and the steering angle command based on the automatic control by the steering control device 40 is input to the front-wheel steering device 13, the steering control device 40 automatically controls the steering angle of the front and rear wheels as described in the first embodiment or the second embodiment, to thereby execute the coupling assistance.

Figure 14:
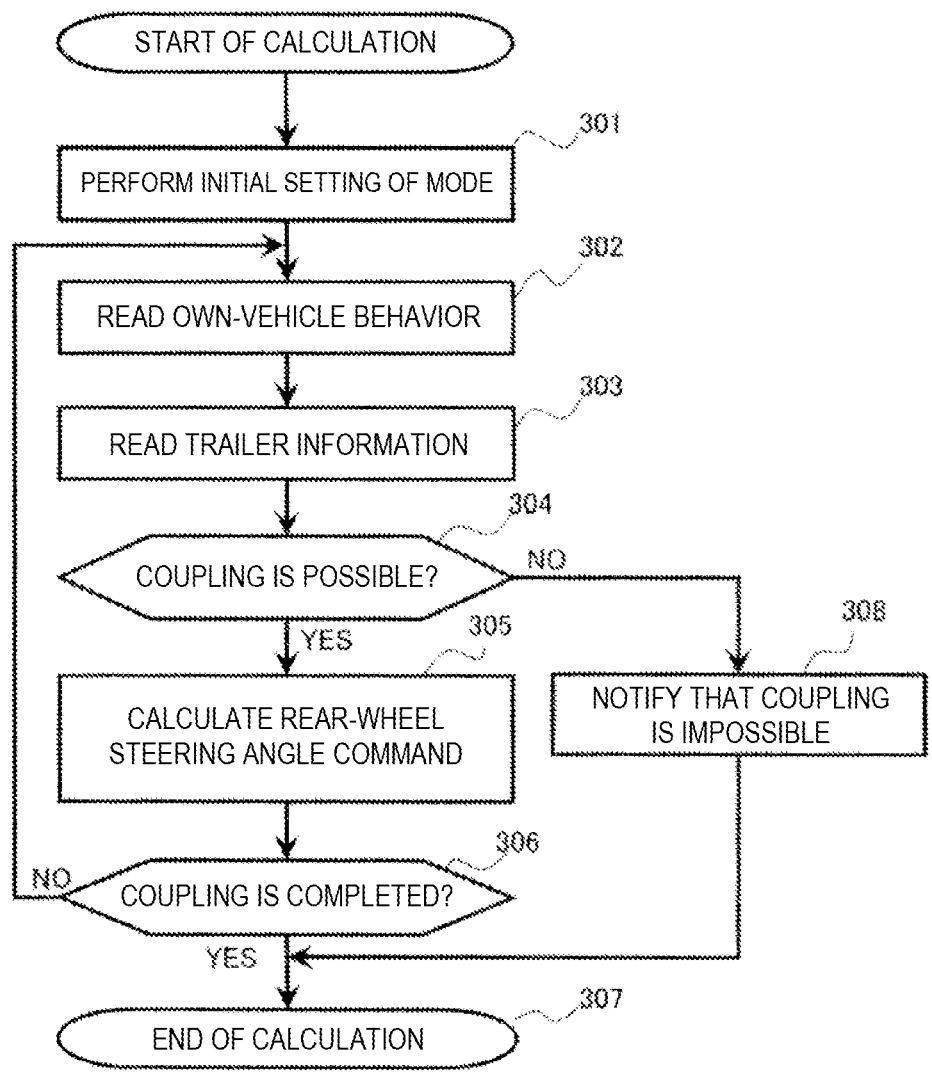
FIG. 14 is a flowchart for illustrating a procedure of steering angle control of coupling assistance control in a third embodiment of the present invention.

A flowchart of FIG. 14 shows the automatic control of the rear-wheel steering angle for the coupling assistance executed when the steering angle of the front wheels 11 and 11 is controlled through the manual operation of the driver (when the manual steering detection unit 63 detects the manual steering).

In Step S301 to Step S304 of the flowchart of FIG. 14, the steering control device 40 executes the same processing as that of Step S101 to Step S104 of the flowchart of FIG. 5, and a detailed description thereof is therefore omitted.

In Step S304 (coupling possibility determination unit), when the absolute value of the coordinate value "u" indicating the position of the second coupling part 30B is equal to or smaller than the absolute value of the maximum displacement amount U max calculated as given by Expression 4 (|u|≤|U max|), the steering control device 40 determines that the coupling can be achieved, and the process proceeds from Step S304 to Step S305 (target steering amount calculation unit).

In Step S305, the steering control device 40 calculates the steering angle control command for the rear wheels 12 and 12 as the coupling assistance so as to compensate for excess or deficiency of the front-wheel steering angle controlled by the driver.

That is, the steering control device 40 obtains the target lateral movement amount UE and the target rotation angle θE for moving the first coupling part 30A toward the second coupling part 30B, assumes that the front-wheel steering angle (detection value by the front-wheel steering angle sensor 15) controlled by the driver is the front-wheel command steering angle δf*, and calculates the rear-wheel command steering angle δr* that enables the target lateral movement amount UE and the target rotation angle θE to be achieved at the time when the front-wheel steering angle is the front-wheel command steering angle δf* (see FIG. 9).

After that, the steering control device 40 outputs the signal of the calculated rear-wheel command steering angle δr* to the actuator control unit 41, to thereby automatically control the steering angle of the rear wheels 12 and 12 so as to achieve the rear-wheel command steering angle δr*.

In Step S306 to Step S308, the steering control device 40 executes the same processing as that of Step S108 to Step S110 of the flowchart of FIG. 5, and a detailed description thereof is therefore omitted.

According to the third embodiment, even when excess or deficiency of the front-wheel steering angle by the driver occurs in the case in which the steering angle of the front wheels 11 and 11 is controlled by the driver, the steering angle of the rear wheels is controlled so as to compensate for the excess or deficiency, resulting in highly accurate coupling assistance.

Fourth Embodiment

Description is now given of a countermeasure, as a fourth embodiment of the present invention, for a case in which the front wheels 11 and 11 or the rear wheels 12 and 12 enter a failsafe state during the execution of the coupling assistance control.

The failsafe state is an abnormal state in which the movements of the wheels do not follow the steering angle commands (steering angle control commands), and the steering angles are fixed.

Figure 15:
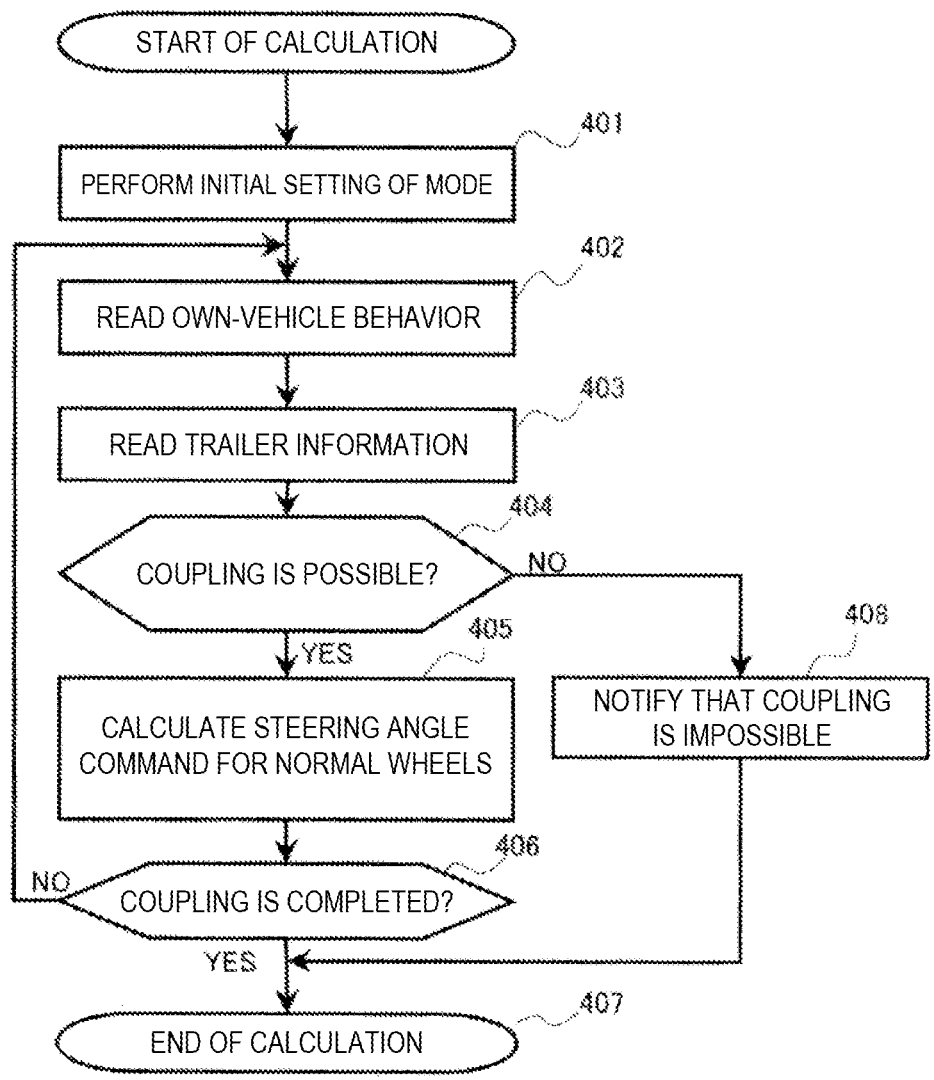
FIG. 15 is a flowchart for illustrating a procedure of steering angle control of coupling assistance control in a fourth embodiment of the present invention.

A flowchart of FIG. 15 shows automatic control for the front-wheel steering angle and the rear-wheel steering angle for the coupling assistance executed when the front/rear-wheel failure detection unit 64 detects that the front wheels 11 and 11 or the rear wheels 12 and 12 enter the failsafe state.

When none of the front wheels 11 and 11 and the rear wheels 12 and 12 are in the failsafe state, and are thus in the normal state in which the steering angles are changed in accordance with the steering angle commands, the steering control device 40 automatically controls the steering angles of the front and rear wheels, to thereby execute the coupling assistance as in the first embodiment or the second embodiment.

In Step S401 to Step S403 of FIG. 15, the steering control device 40 executes the same processing as that of Step S101 to Step S103 of the flowchart of FIG. 5, and a detailed description thereof is therefore omitted.

In Step S404 (coupling possibility determination unit), as in Step S104, the steering control device 40 compares the coordinate value "u" of the second coupling part 30B on the U axis and the maximum displacement amount U max with each other, to thereby determine whether or not the second coupling part 30B can be coupled to the first coupling part 30A through the coupling assistance control provided by the four-wheel steering.

The front wheels 11 and 11 or the rear wheels 12 and 12 are in the failsafe state, and hence the steering control device 40 changes the maximum displacement amount U max in accordance with a fixed steering angle (failure steering angle) of the wheels in the failsafe state.

For example, when the front wheels 11 and 11 are in the failsafe state, the steering control device 40 obtains the maximum slip angle βmax and the minimum turning radius Rmin as values at the time when the steering angle δf of the front wheels 11 and 11 is set to the current fixed steering angle and the steering angle δr of the rear wheels 12 and 12 is set to the maximum steered angle toward the opposite direction to that of the front wheels 11 and 11.

After that, the steering control device 40 obtains the maximum displacement amount Ufalemax based on the maximum slip angle βmax and the minimum turning radius Rmin in the failsafe state, and determines that the coupling can be achieved when the absolute value of the coordinate value "u" indicating the position of the second coupling part 30B is equal to or smaller than the absolute value of the maximum displacement amount Ufalemax (|u|≤|Ufalemax|).

When the steering control device 40 determines that the coupling can be achieved in Step S404, the process proceeds to Step S405 (target steering amount calculation unit), and the steering control device 40 calculates the steering angle control commands.

In Step S405, the steering control device 40 calculates the steering angle control command for the wheels to which the steering control can be applied so that the first coupling part 30A moves toward the second coupling part 30B under the condition that the steering angle of one of the front wheels and the rear wheels is fixed.

For example, when the front wheels 11 and 11 are in the failsafe state, the steering control device 40 obtains the target lateral movement amount UE and the target rotation angle θE for moving the first coupling part 30A toward the second coupling part 30B, assumes that the fixed steering angle of the front wheels 11 and 11 is the front-wheel command steering angle δf*, and calculates the rear-wheel command steering angle δr* that enables the target lateral movement amount UE and the target rotation angle θE to be achieved at the time when the fixed steering angle of the front wheels 11 and 11 is the front-wheel command steering angle δf* (see FIG. 9).

In Step S406 to Step S408 of FIG. 15, the steering control device 40 executes the same processing as that of Step S108 to Step S110 of the flowchart of FIG. 5.

According to the fourth embodiment, even when one of the front wheels 11 and 11 and the rear wheels 12 and 12 is in the failsafe state, the steering angle control as the coupling assistance is executed when the coupling can be achieved through the control of the steering angle of the wheels not in the failsafe state, and it is thus possible to extend the situation in which the coupling assistance can be executed, thereby increasing convenience.

The technical concepts described in the above-mentioned embodiments may be used in combination as required, as long as no conflict arises.

Further, although the details of the present invention are specifically described above with reference to the preferred embodiments, it is apparent that persons skilled in the art may adopt various modification aspects based on the basic technical concepts and teachings of the present invention.

For example, the second embodiment may be configured such that the driver can select whether or not to set the condition that the vehicle 10 and the trailer 20 are aligned substantially straight at the time of the coupling as the execution condition for the first steering angle control mode.

Further, the second embodiment may be configured such that the driver can suitably change the allowable angle Mr.

Still further, as the execution condition for the steering control in the first steering angle control mode, a condition of the distance between the first coupling part 30A and the second coupling part 30B may be added, and the steering control device 40 may cause the first steering angle control mode to transition to the second steering angle control mode, for example, after the distance between the first coupling part 30A and the second coupling part 30B becomes shorter than a threshold value.

Moreover, the steering control device 40 may notify the driver, through the HMI device 42, of information on a movement direction and a movement distance of the vehicle 10 in order to achieve the coupling when the coupling is determined to be impossible, or may notify the driver, through the HMI device 42, of the state in which the vehicle 10 has moved into the range in which the coupling can be achieved.

Yet further, the steering control device 40 may set a limiter for the travel speed so as to prevent a state in which the travel speed of the vehicle 10 becomes excessively high during the steering control for the coupling assistance (for example, when the first steering angle control mode is selected) and the accuracy of the coupling assistance control consequently decreases, and may output control commands for a braking force and a driving force so that the travel speed does not exceed the limiter.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2019-090763 filed on May 13, 2019. All disclosed contents including Specification, Scope of Claims, Drawings, and Abstract of Japanese Patent Application No. 2019-090763 filed on May 13, 2019 are incorporated herein by reference in their entirety.

REFERENCE SIGNS LIST 10 vehicle, 11 front wheel, 12 rear wheel, 13 front-wheel steering device, 14 rear-wheel steering device, 15 front-wheel steering angle sensor, 16 rear-wheel steering angle sensor, 20 trailer, 30 coupler, 30A first coupling part, 30B second coupling part, 40 steering control device (steering control unit), 41 actuator control unit, 42 HMI device (notification unit), 61 external world recognition unit, 62 vehicle speed sensor, 63 manual steering detection unit, 64 front/rear-wheel failure detection unit

The invention claimed is:

1. A vehicle coupling assistance device, comprising a steering control unit configured to assist in coupling between a vehicle and a trailer, the vehicle including a front-wheel steering device configured to control a steering angle of front wheels of the vehicle, a rear-wheel steering device configured to control a steering angle of rear wheels of the vehicle, and a first coupling part, the trailer including a second coupling part to be coupled to the first coupling part, wherein the steering control unit is configured to:
  acquire a physical quantity relating to an angle of the second coupling part with respect to the first coupling part based on external world information acquired by an external world recognition unit;
  select, as a steering angle control mode, any one of a first steering angle control mode in which the steering angle of the front wheels and the steering angle of the rear wheels are controlled to achieve the same steering angle and a second steering angle control mode in which the steering angle of the front wheels and the steering angle of the rear wheels are controlled to achieve different steering angles in accordance with the physical quantity relating to the angle, such that: i) the first steering angle control mode is selected when a position of the second coupling part is within a range in which the coupling to the first coupling part through a parallel movement of the front wheels and the rear wheels is achieved, and ii) the second steering angle control mode is selected when the position of the second coupling part is not within the range in which the coupling to the first coupling part through a parallel movement of the front wheels and the rear wheels is achieved; and
  output steering angle control commands for executing control in the selected steering angle control mode to the front-wheel steering device and the rear-wheel steering device.

2. The vehicle coupling assistance device according to claim 1, wherein the steering control unit is configured to select, as the steering angle control mode, the first steering angle control mode when the physical quantity relating to the angle is equal to or smaller than a predetermined value relating to the angle.

3. The vehicle coupling assistance device according to claim 2, wherein the steering control unit is configured to set the predetermined value based on a smaller maximum steered angle out of a maximum steered angle of the front wheels and a maximum steered angle of the rear wheels.

4. The vehicle coupling assistance device according to claim 3, wherein the steering control unit is configured to set the predetermined value at a time when the first steering angle control mode is selected as the steering angle control mode and the predetermined value at a time when the second steering angle control mode is selected as the steering angle control mode such that hysteresis is provided between setting of the predetermined value at the time when the first steering angle control mode is selected and setting of the predetermined value at the time when the second steering angle control mode is selected.

5. The vehicle coupling assistance device according to claim 1, wherein the steering control unit is configured to:
  acquire a physical quantity relating to a relative yaw angle of the trailer with respect to the vehicle based on the external world information; and
  select, as the steering angle control mode, any one of the first steering angle control mode and the second steering angle control mode based on the physical quantity relating to the relative yaw angle and the physical quantity relating to the angle.

6. The vehicle coupling assistance device according to claim 5, wherein the steering control unit is configured to select, as the steering angle control mode, the first steering angle control mode when the physical quantity relating to the angle is equal to or smaller than a predetermined value relating to the angle and the physical quantity relating to the relative yaw angle is equal to or smaller than a predetermined value relating to the relative yaw angle.

7. The vehicle coupling assistance device according to claim 1, wherein the steering control unit is configured to:
  acquire a physical quantity relating to a relative position of the second coupling part with respect to the first coupling part based on the external world information;
  determine whether the coupling of the vehicle to the trailer is possible based on the physical quantity relating to the relative position; and
  select, as the steering angle control mode, any one of the first steering angle control mode and the second steering angle control mode based on the physical quantity relating to the angle when the coupling is determined to be possible.

8. The vehicle coupling assistance device according to claim 7, wherein the steering control unit is configured to output a command for notifying a notification unit mounted to the vehicle that the coupling is impossible when the coupling is determined to be impossible.

9. The vehicle coupling assistance device according to claim 1, wherein the front-wheel steering device is configured to receive input of a steering angle command which is based on automatic control.

10. The vehicle coupling assistance device according to claim 1, wherein the front-wheel steering device is configured to receive input of a steering angle command which is based on a steering operation by a driver.

11. The vehicle coupling assistance device according to claim 1, wherein the steering control unit is configured to:

acquire a physical quantity relating to a relative position of the second coupling part with respect to the first coupling part based on the external world information;

acquire information on a failure steering angle of wheels in a failsafe state out of the front wheels and the rear wheels; and determine whether the vehicle is capable of being coupled to the trailer based on the information on the failure steering angle and the physical quantity relating to the relative position.

12. A vehicle coupling assistance method for assisting in coupling between a vehicle and a trailer, the vehicle including a front-wheel steering device configured to control a steering angle of front wheels of the vehicle, a rear-wheel steering device configured to control a steering angle of rear wheels of the vehicle, and a first coupling part, the trailer including a second coupling part to be coupled to the first coupling part, the vehicle coupling assistance method comprising:
acquiring a physical quantity relating to an angle of the second coupling part with respect to the first coupling part based on external world information acquired by an external world recognition unit;

selecting, as a steering angle control mode, any one of a first steering angle control mode in which the steering angle of the front wheels and the steering angle of the rear wheels are controlled to achieve the same steering angle and a second steering angle control mode in which the steering angle of the front wheels and the steering angle of the rear wheels are controlled to achieve different steering angles in accordance with the physical quantity relating to the angle, such that: i) the first steering angle control mode is selected when a position of the second coupling part is within a range in which the coupling to the first coupling part through a parallel movement of the front wheels and the rear wheels is achieved, and ii) the second steering angle control mode is selected when the position of the second coupling part is not within the range in which the coupling to the first coupling part through a parallel movement of the front wheels and the rear wheels is achieved; and outputting steering angle control commands for executing control in the selected steering angle control mode to the front-wheel steering device and the rear-wheel steering device.

13. A vehicle coupling assistance system for assisting in coupling between a first coupling part included in a vehicle and a second coupling part included in a trailer, the vehicle coupling assistance system comprising:
an external world recognition unit configured to acquire external world information on the vehicle; and a steering control unit configured to:
acquire a physical quantity relating to an angle of the second coupling part with respect to the first coupling part based on the external world information acquired by the external world recognition unit;

select, as a steering angle control mode, any one of a first steering angle control mode in which a steering angle of front wheels and a steering angle of rear wheels are controlled to achieve the same steering angle and a second steering angle control mode in which the steering angle of the front wheels and the steering angle of the rear wheels are controlled to achieve different steering angles in accordance with the physical quantity relating to the angle, such that: i) the first steering angle control mode is selected when a position of the second coupling part is within a range in which the coupling to the first coupling part through a parallel movement of the front wheels and the rear wheels is achieved, and ii) the second steering angle control mode is selected when the position of the second coupling part is not within the range in which the coupling to the first coupling part through a parallel movement of the front wheels and the rear wheels is achieved; and output steering angle control commands for executing control in the selected steering angle control mode;

a front-wheel steering device configured to acquire the steering angle control command output from the steering control unit; and a rear-wheel steering device configured to acquire the steering angle control command output from the steering control unit.

14. The vehicle coupling assistance system according to claim 13, wherein the external world recognition unit is installed at a place other than the vehicle.

* * * * *